United States Patent [19]

Stephens

[11] Patent Number: 4,543,830

[45] Date of Patent: Oct. 1, 1985

[54] GAS TURBINE RUB DETECTOR

[76] Inventor: James O. Stephens, P.O. Box 1361, Niagara-on-the-Lake, Ontario, Canada, L0S 1J0

[21] Appl. No.: 559,686

[22] Filed: Dec. 9, 1983

[51] Int. Cl.⁴ .......................................... G01M 15/00
[52] U.S. Cl. ...................................... 73/660; 73/117.3
[58] Field of Search .................... 73/660, 116, 117.3, 73/645, 654, 646; 340/683

[56] References Cited

U.S. PATENT DOCUMENTS 3,400,578  9/1968  Frarey et al. ................... 73/660 X
3,856,991 12/1974  Kirkland, Jr. et al. ........... 73/646 X Primary Examiner—Jerry W. Myracle
Attorney, Agent, or Firm—McConnell & Fox

[57] ABSTRACT

The condition of a gas turbine is monitored by locating a microphone in the air inlet and listening to or recording the sounds detected during certain periods of the machine operating cycle. By proper selection and control of those periods, the operator is enabled to detect rubs or other problems but is not exposed to undesirable noise levels.

7 Claims, 2 Drawing Figures

GAS TURBINE RUB DETECTOR

BACKGROUND OF THE INVENTION

As gas turbines age a certain amount of creep takes place in the hot and highly stressed parts. This creep results in extension of blades and discs which eventually will cause the blade tip clearance to become zero. Zero clearance results in a rub between the blade tip and the stationary parts of the turbine. Such minimum clearance becomes accentuated at particular periods of the cycle depending upon the type of turbine under consideration. For example, in a tapered gas turbine cylinder with the thrust bearing at the inlet end, as the rotor cools faster than the cylinder, the clearance reduces more on shutdown than normal. On the other hand, with an exhaust-mounted thrust bearing, the minimum clearance occurs during start-up.

FIELD OF THE INVENTION

The invention has particular application to gas turbines and especially those which are nearing their design life. Many early gas turbines were designed for 100,000 hour life at full load conditions based upon the best metallurgical data available at the time. Operators are, therefore, faced with the problem of determining whether a particular gas turbine should be stopped and the hot parts replaced or rejuvenated to overcome the loss of clearance resulting from creep.

DESCRIPTION OF THE PRIOR ART

In the prior art of turbines in general it has been common practice to have the operator check various points in the turbine to determine whether unusual noises are occurring. For example, with steam turbines, an operator would quite commonly place a listening rod in contact with portions of the turbine to determine whether a rub was occurring.

SUMMARY OF THE INVENTION

In accordance with the present invention, a microphone is placed at the inlet of the gas turbine. This microphone will pick up noises during start-up and shutdown thereby indicate to the operator whether the particular turbine is rubbing unduly or more frequently than is acceptable based on the operator's experience. By evaluation of the noise heard at particular points of operation, the operator can determine whether the turbine should be stopped and the hot parts replaced. However, it is not practical for the microphone to operate during the whole of the turbine cycle from start-up to shutdown because of the tremendous variation in noise level at the microphone. If all the microphone output were amplified and provided to the operator he would be subject to the most distracting noise level which is quite unacceptable. In accordance with this invention, the period of operation of the microphone is limited to that period where rubs are most readily detected and operation during the period when the noise is maximum is prohibited.

DESCRIPTION OF THE PREFERRED EMBODIMENTS

Figure 1:
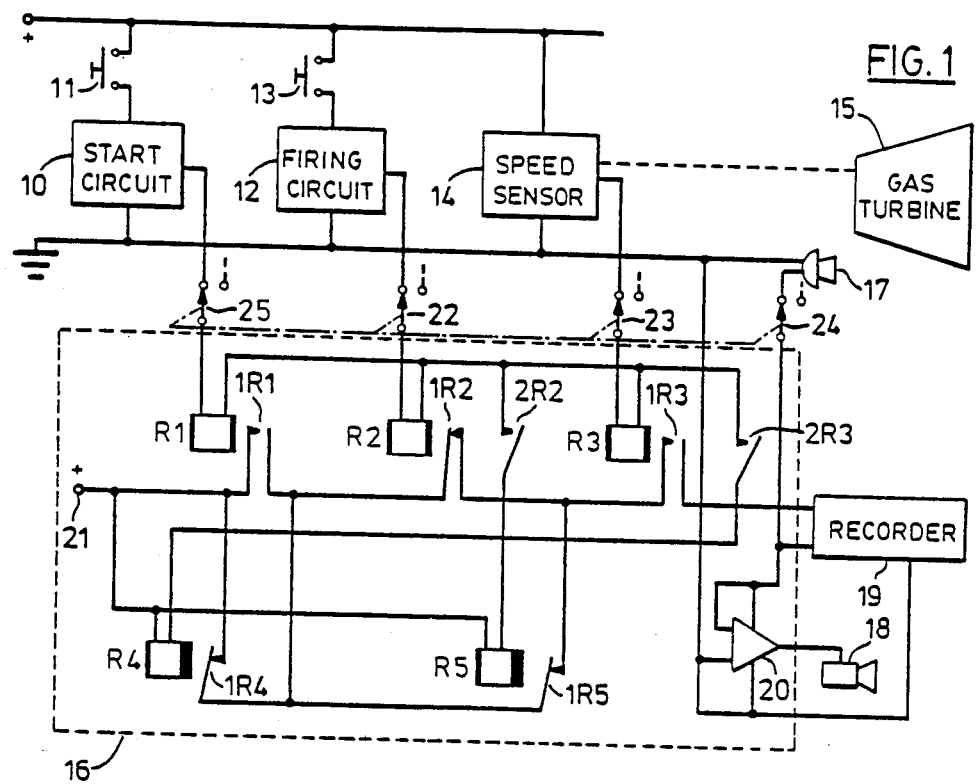
FIG. 1 of the drawings is a schematic diagram of a gas turbine control system including the rub detector in accordance with the present invention.

Considering FIG. 1, it will be seen that the figure illustrates diagramatically in the upper portion the normal control circuits for starting and controlling the gas turbine. This consists of a start circuit 10 and an operator's control push-button 11, a firing circuit 12 and a control switch associated therewith designated 13, a speed sensor 14 which may be a simple pressure sensor in the compressor and the gas turbine 15. The lower part of FIG. 1 includes a portion within dotted lines which comprises a control system 16. Connected to the control system is a microphone 17 in the inlet of the turbine, a loudspeaker 18 and an optional recorder 19 in the operator's control room. The portion within the dotted line 16, that is the control circuit, comprises a series of relays R1 to R5 and their associated contacts and an amplifier and is connected to the turbine system through a multipole switch consisting of elements 25, 21, 22, 23 and 24.

OPERATION

To start the turbine the operator depresses push-button 11 thus energizing the start circuit 10 which causes the gas turbine to be rotated by means of a suitable starting device. At the same time, the start circuit applies a potential to the coil of relay R1 causing the normally open contacts 1R1 to be closed. After the turbine has reached the desired rotational speed, the firing circuit is energized automatically or by the operator by depressing control switch 13. This provides potential to the coil of relay R2 opening contacts 1R2 which are normally closed and closing contacts 2R2 which are normally open. when the gas turbine is below a certain proportion of its normal speed, the speed sensor 14 applies a potential to the coil of relay R3 thus closing the contacts of relay R3, that is contact 1R3 and 2R3 which are normally open. The closing of contact 2R3 energizes the coil of relay R4 thus opening the normally closed contacts 1R4. The closing of relay contacts 2R2 energizes relay R5 by providing a potential to its coil, thus opening contacts 1R5 which are normally closed. As will be seen, contacts 1R4 are across contacts 1R1 and contacts 1R5 are across contacts 1R2. The potential applied to terminal 21 is applied to amplifier 20 to cause it to be operative when a suitable series of contacts 1R1, 1R2 and 1R3 are closed to provide a circuit to the amplifier. The recorder 19 is similiarly energized from terminal 21 when the relay contacts are closed. The output from microphone 17 is applied to the recorder 19 and also through the amplifier 20 to the loudspeaker 18.

Figure 2:
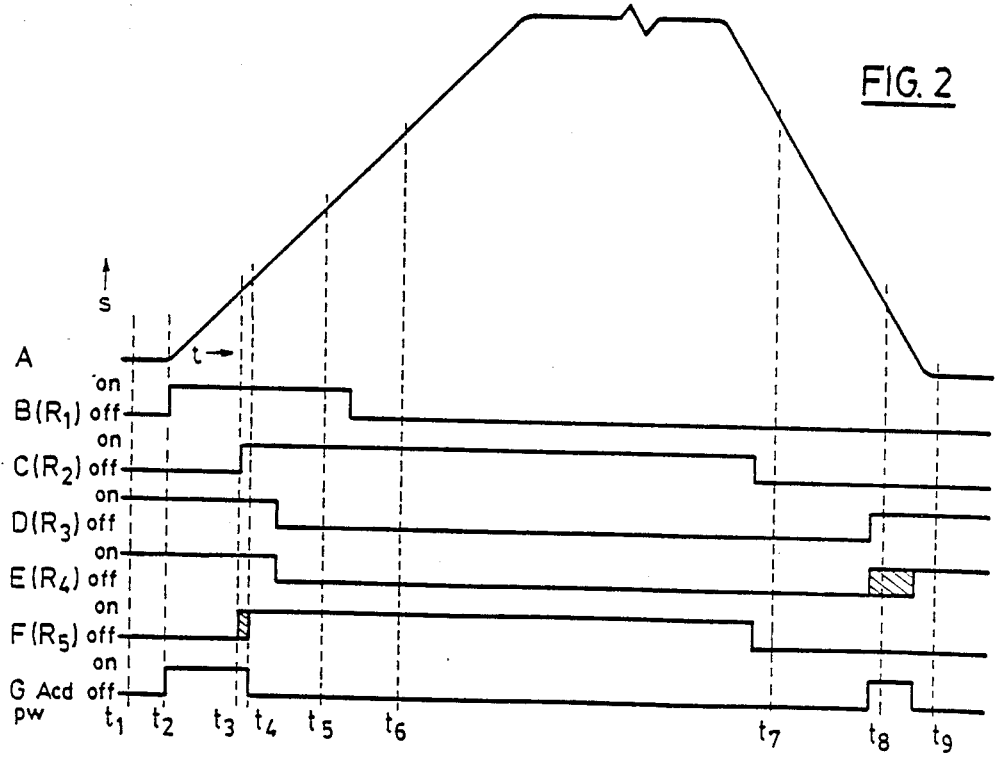
FIG. 2 is a series of graphs which illustrate the operation of the various relays of the system under various turbine conditions.

Turning now to FIG. 2, the function of the relays will be explained in conjunction with the various graphs. The first graph A is a time-speed graph of the turbine, B is a graph of the condition or activation of relay R1, C is a graph of the condition of relay R2, D is a graph of the condition of relay R3, E is a graph of the condition of the relay R4, F is a graph of the condition of relay R5, G is a graph of the voltage applied to the amplifier 20 and the recorder 19. As soon as the system is switched on at time $t_1$ relay R1 is not energized, relay R2 is not energized, relay R3 is energized because the potential from the speed sensor 14 is applied when the speed is below a certain value. Relay R4 is energized because contacts 2R3 are closed thus energizing relay R4. Relay R5 is de-energized because relay R2 is not energized. As a result, no potential is applied to the amplifier or recorder since there is no complete circuit from terminal 21 to the amplifier through the various relay contacts. At time $t_2$ the operator pushes the pushbutton 11 thus energizing the start circuit and applying a potential to relay R1 causing relay R1 to be operative. With relay R1 on, contacts 1R1 are closed thus completing a circuit from terminal 21 to the amplifier 20 and the recorder 19 causing the amplifier to operate and any sound picked up by microphone 17 is passed through the amplifier 20 and out through the loudspeaker 18 and/or into the recorder 19 as desired. At time $t_3$, the operator is satisfied with the speed of rotation of the gas turbine and either automatically or manually activates the firing circuit by closing control switch 13 thus also energizing relay R2. The operation of relay R2 closes contacts 2R2 thus energizing relay R5. Relay R5 is a time-delay relay and does not respond immediately to energization. The hatched portion of this graph F illustrates the delay between energization and operation. At time $t_4$, relay R5 times out and operates thus opening contacts 1R5. When the contacts 1R5 open there is no circuit between terminal 21 and the amplifier and the amplifier ceases to receive power as shown at G in FIG. 2. When the speed of the turbine reaches a predetermined value, the speed sensor ceases to apply a potential to R3 and R3 is de-energized. When R3 goes off, contacts 2R3 open and R4 is de-energized. At time $t_6$, the start circuit has completed its operation and relay R1 is de-energized. At time $t_7$, the operator terminates the operation of the firing circuit to shut down the machine. R1 is therefore de-energized and goes off. When R1 is de-energized, R5 is de-energized and immediately goes off because the contacts of R2, that is contacts 2R2, open thus de-energizing R5 and contacts 1R5 close. The supply of potential from terminal 21 to amplifier 20 is still not provided because the speed sensor still indicates a speed in excess of a certain value. When this value is reached, a potential is provided from the speed sensor causing R3 to be energized. The energization of R3 closes contacts 2R3 thus energizing relay R4. Relay R4 is a time-delay relay and does not immediately operate. The delay between energization and operation of the contacts is shown in the hatched portion of the graph. With contacts 1R3 closed, a circuit is provided from terminal 21 through contacts 1R4, contacts 1R2 and contacts 1R3 to the amplifier 20. When relay R4 times out and goes off contacts 1R4 open thus interrupting the supply to the amplifier as shown at G in FIG. 2. At time $t_9$, the amplifier is no longer energized and the system remains in this condition until reactuated by starting up the turbine once more.

It will be seen that the audio power as shown at G in FIG. 2 is supplied from the start of the turbine to a time determined by the switch-on of R5. This includes a short time after ignition and therefore the operator can hear sounds from the loudspeaker of the start-up of the gas turbine and the ignition of the gas turbine. To avoid undue noise, which would occur as the gas turbine starts to reach its normal operating speed, the audio power is switched off. The delay of R5 is just sufficient to permit the operator to hear ignition.

During shutdown the amplifier is inoperative until such time as the gas turbine has fallen below a certain speed as determined by the speed sensor and then it becomes active and remains active for a period determined by the pickup characteristic of relay R4 which is delayed pickup relay, and this period may be sufficient to span the time from the minimum speed time until the turbine reaches essentially zero rotational speed. The length of this time is determined by the characteristic of relay R4.

It will be seen therefore that the circuit will turn the amplifier on during the start-up for a period permitting the operator to hear the start-up conditions and will turn the amplifier on again during shutdown to permit the operator to listen to the slow down characteristics. However, because of the operation of relay R3 by the speed sensor, the amplifier cannot operate at any time when the speed of the turbine is above a certain value.

For normal operation of an industrial gas turbine, the firing circuit is energized at 10-20% of the normal operating speed. This would normally be in the neighbourhood of 2 minutes for heavy-duty machines, but only 10 seconds for an aircraft derivative-type of machine. Thereafter the audio system is maintained active for a further 5 seconds determined by the characteristic of R5.

On shutdown, the times involved are much shorter, and while shown in graph A of FIG. 2 as being in the order of 4 minutes, in fact may only be a matter of seconds, the graph having been distorted for the purpose of clarity. In fact the turbine would normally reach a 30% speed in about 5–30 seconds depending on the type of turbine.

After the speed sensor detects that the speed has fallen sufficiently, that is to about 30% of design speed, the operation of relay R4 permits the audio system to be operational for a period determined by the charactistic of relay R4 and in the present case is illustrated as maintaining the audio system operative for about 1 minute after speed sensor 14 senses that the speed is suitable.

In a typical industrial application, the gas turbine start circuit rotates the machine in the start mode to about 10–20% of design speed when the firing circuit is energized. This whole operation would take about 2 minutes plus the delay of relay 5. The speed sensor, however, operates at about 30% of design speed and as previously indicated, the operation of the speed sensor and relay R3 ensure that no sound from the microphone is amplified as long as the speed is above 30% of design speed.

During slowdown, the speed will coast down to 30% of design speed in about 30 seconds for an industrial or 5 seconds for an aircraft derivative-type turbine. For a predetermined time thereafter, determined by the characteristic of relay R4, the audio system remains active and thereafter is switched off.

While a particular circuit has been illustrated to provide the desired results, it will be understood that basically this invention is directed to a general selection of suitable time of operation of the audio system to ensure that the operator is not exposed to sound levels about 70 D.B. for example. By selecting the operation of the speed sensor to ensure that the amplifier is not operative above a certain speed and by selecting the characteristic of relays R4 and R5 this requirement is fulfilled.

While the system has been illustrated in conjunction with relays, it will be evident that the same characteristics can be obtained from other contact operating or contactless devices which provide the same control as that provided by the present system. For example, the relays could be replaced by suitable solid state devices. It will also be evident that certain functions of those components within control system 16 may be performed by apparatus already available in the turbine control system. For example, contacts 1R1 may be available in the start circuit and not require a separate relay. Similiarly, contacts 1R2 and 1R3 may be available in the firing circuit and speed sensor respectively.

The system has been illustrated in the particular manner for purposes of clarity only.

In a multiturbine installation each turbine may be provided with a microphone and connected to a set of terminals on the multipole switch. For example, the start circuit of a second turbine may be connected to the second terminal of element 25 of the switch, as shown in dotted lines.

When starting or stopping each turbine the operator need only operate the multipole switch to select a particular turbine and monitor its condition.

While a recorder 19 is shown, such a device is optional. Under some circumstances a recorder which provides a permanent graphical record of the sounds picked up by microphone 17 may permit subsequent study, comparison and analysis and thus provide a more accurate appreciation of machine condition.

I claim:

1. A gas turbine condition sensing system comprising a noise pickup device located in the air intake of a turbine, a remote transducer for reproducing the noise detected by said pickup device, coupling means for coupling said pickup device to said transducer only during selected portion of the operating cycle of said turbine, said portion of the operating cycle being selected to limit the level of the output from said transducer to a specified level wherein said coupling (device) means includes an amplifier activated only during start-up and shutdown of the turbine but is inhibited when the turbine is operating at normal running speed.

2. A gas turbine condition sensing system as claimed in claim 1 wherein the activation of said amplifier is controlled in response to the turbine system start and firing circuit conditions.

3. A gas turbine condition sensing system as claimed in claim 1 wherein said remote transducer includes a recorder for reproducing the noise detected in graphical form.

4. A gas turbine condition sensing system as claimed in claim 1 associated selectably with any one of a plurality of gas turbines each said turbine including a noise pickup device coupled to said transducer only during selected portions of the operating cycle of a selected one turbine.

5. A gas turbine condition sensing system comprising a microphone located in the air intake of a gas turbine, a loudspeaker located near an operator's console, an amplifier for applying the output of said microphone to said loudspeaker, means to detect the condition of the turbine starting circuit, means to detect the condition of the turbine firing circuit, means to detect the rotational speed of said turbine and means to activate said amplifier in response to condition of said starting circuit, said firing circuit and the rotational speed of said turbine.

6. A gas turbine condition sensing system as claimed in claim 5 including a graphical recorder activated concurrently with said amplifier and responsive to the output of said microphone.

7. A condition sensing system for a plurality of gas turbines, each said turbine having a microphone located in the air intake, an amplifier for applying the outputs from said microphones to a loudspeaker located near an operator's console, means permitting the operator to select a specific turbine and detect the starting and firing condition and the rotational speed of the selected turbine and means to control said amplifier in response to the detected conditions and speed.

* * * * *